(12) United States Patent
Fujita et al.

(10) Patent No.: US 9,496,747 B2
(45) Date of Patent: Nov. 15, 2016

(54) CHARGING SUPPORT METHOD, MANAGEMENT DEVICE, AND SUPPORT SYSTEM FOR PERFORMING WIRELESS CHARGING AMONG PLURALITY OF DEVICES

(71) Applicant: FUJIFILM Corporation, Tokyo (JP)

(72) Inventors: Koudai Fujita, Saitama (JP); Ryousuke Itou, Saitama (JP); Junji Hayashi, Saitama (JP); Masanari Asano, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 15 days.

(21) Appl. No.: 14/593,626

(22) Filed: Jan. 9, 2015

(65) Prior Publication Data

US 2015/0123607 A1 May 7, 2015

Related U.S. Application Data

(63) Continuation of application No. PCT/JP2013/062458, filed on Apr. 26, 2013.

(30) Foreign Application Priority Data

Jul. 10, 2012 (JP) ................. 2012-154706

(51) Int. Cl.
*H02J 7/00* (2006.01)
*H02J 7/02* (2016.01)
*H04B 5/00* (2006.01)

(52) U.S. Cl.
CPC .............. *H02J 7/025* (2013.01); *H02J 7/0004* (2013.01); *H02J 7/0013* (2013.01); *H02J 7/0047* (2013.01);

(Continued)

(58) Field of Classification Search
USPC ........................................................ 320/108
See application file for complete search history.

(56) References Cited

U.S. PATENT DOCUMENTS 5,963,012 A * 10/1999 Garcia ............... G01R 31/3648
320/106
6,803,746 B2 * 10/2004 Aker .................... H02J 7/0042
320/139

(Continued)

FOREIGN PATENT DOCUMENTS

JP 2003-262525 A 9/2003
JP 2004-222457 A 8/2004

(Continued)

OTHER PUBLICATIONS

Chinese Office Action and Search Report, dated Aug. 24, 2015, for corresponding Chinese Application No. 201380036827.1, with an English translation.

(Continued)

*Primary Examiner* — Yalkew Fantu
(74) *Attorney, Agent, or Firm* — Birch, Stewart, Kolasch & Birch, LLP

(57) ABSTRACT

A system includes a plurality of electronic apparatuses which have a function of feeding power of a battery to other electronic apparatuses and a function of receiving power from other electronic apparatuses and charging the battery, a management server, and a database. The management server records, in the database, positional information of power feedable electronic apparatuses which permit a power feed to other electronic apparatuses, acquires positional information of a power feed-desiring electronic apparatus which desires a power feed from other electronic apparatuses, specifies a power feedable electronic apparatus in the periphery of the power feed-desiring electronic apparatus using the acquired positional information and the positional information of the power feedable electronic apparatuses in the database, and transmits the positional information of the specified electronic apparatus to the power feed-desiring electronic apparatus.

7 Claims, 12 Drawing Sheets

(52) U.S. Cl.
CPC .......... *H02J 7/0054* (2013.01); *H04B 5/0037* (2013.01); *H02J 2007/0096* (2013.01); *H04B 5/0093* (2013.01)

(56) References Cited

U.S. PATENT DOCUMENTS

| | | | |
|---|---|---|---|
| 6,914,416 B2 * | 7/2005 | Thomas | H02H 9/042 257/712 |
| 2011/0221391 A1 | 9/2011 | Won et al. | |
| 2012/0109409 A1 | 5/2012 | Hara | |
| 2015/0137601 A1 * | 5/2015 | Fujita | H04B 5/0037 307/31 |

FOREIGN PATENT DOCUMENTS

| | | | |
|---|---|---|---|
| JP | 2009-219330 A | | 9/2009 |
| JP | 2009-261156 A | | 11/2009 |
| JP | 2009-267517 A | | 11/2009 |
| JP | 2009-267517 | * | 12/2009 |
| JP | 2010-28916 A | | 2/2010 |
| JP | 2010-74992 A | | 4/2010 |
| JP | 2010-115064 A | | 5/2010 |
| JP | 2012-55038 A | | 3/2012 |
| JP | 2012-108870 A | | 6/2012 |
| WO | WO2011/112009 | * | 9/2011 |
| WO | WO 2011/112009 A2 | | 9/2011 |
| WO | WO 2011/112060 A2 | | 9/2011 |

OTHER PUBLICATIONS

International Search Report, issued in PCT/JP2013/062458, dated Jul. 30, 2013.
Office Action dated Dec. 2, 2014 in Japanese Priority Application No. 2012-154706.
Written Opinion of the International Searching Authority, issued in PCT/JP2013/062458, dated Jul. 30, 2013.
Chinese Office Action and English translation dated Jan. 15, 2016 for corresponding Application No. 201380036827.1.
International Preliminary Examination Report, issued in PCT/JP2013/062458, dated Jan. 28, 2014 (Form PCT/IPEA/409).

* cited by examiner

FIG. 4

| APPARATUS ID | POSITIONAL INFORMATION | OWNER ID | POWER FEEDABLE RANGE | POWER FEED PERMISSION AND INHIBITION | POWER FEED RECORD [A] | POWER RECEPTION RECORD [A] |
|---|---|---|---|---|---|---|
| 001 | **** | #### | $$$$ | PERMIT | ++++ | |
| 002 | **** | #### | $$$$ | PERMIT | ++++ | ××× |
| 003 | | #### | $$$$ | | | ××× |
| 004 | | #### | $$$$ | INHIBIT | ++++ | ××× |
| 005 | **** | #### | $$$$ | PERMIT | | |
| 006 | **** | | $$$$ | PERMIT | ++++ | ××× |
| . | . | . | . | . | . | . |
| . | . | . | . | . | . | . |
| . | . | . | . | . | . | . |

☆ HOST APPARATUS

○ POWER FEEDABLE APPARATUS (MOBILE APPARATUS)

● POWER FEEDABLE APPARATUS (FIXED APPARATUS)

☆ HOST APPARATUS

Ⓜ POWER FEEDABLE APPARATUS (MOBILE TERMINAL)

Ⓥ POWER FEEDABLE APPARATUS (BICYCLE, BICYCLE, MOTORCYCLE)

CHARGING SUPPORT METHOD, MANAGEMENT DEVICE, AND SUPPORT SYSTEM FOR PERFORMING WIRELESS CHARGING AMONG PLURALITY OF DEVICES

CROSS REFERENCE TO RELATED APPLICATION

This is a continuation of International Application No. PCT/JP2013/062458 filed on Apr. 26, 2013, and claims priority from Japanese Patent Application No. 2012-154706 filed on Jul. 10, 2012, the entire disclosures of which are incorporated herein by reference.

BACKGROUND

1. Technical Field

The present invention relates to a charging support method which supports charging among a plurality of electronic apparatuses.

2. Related Art

In recent years, similarly to smartphones, high performance of mobile terminals, such as mobile phones, and an increase in usage frequency have occurred, and dissatisfaction with a battery of the mobile terminal has become apparent. As a charger which charges the battery of the mobile terminal, there is a wireless charger which feeds power to the mobile terminal in a wireless manner, in addition to a wired charger which feeds power to the mobile terminal in a wired manner.

The wireless charger has advantages in that it is not necessary to connect a charging cable to the mobile terminal, and the appearance becomes simple without a charging cable, and the like. Because of these advantages, it is considered that a wireless charger and a corresponding mobile terminal have become widely available, and various services using a wireless charger have been suggested.

For example, Patent Literature 1 (JP-A-2010-115064) discloses a method which enables charging among electronic apparatuses having a wireless charging function.

Patent Literature 2 (JP-A-2009-219330) discloses a method which connects electronic apparatuses in a non-wireless manner and enables charging between two apparatuses.

SUMMARY OF INVENTION

It is considered that, if a mechanism for mutual charging described in PTLs 1 and 2 becomes widespread, and for example, mutual charging is possible between apparatuses of people who are unknown to each other, it is possible to eliminate dissatisfaction with a battery of an electronic apparatus represented by a mobile terminal.

However, in order to enable mutual charging, a prior agreement between a power feed side and a power reception side is required, and means for recognizing an electronic apparatus capable of performing a power feed is required.

In view of above, illustrative aspects of the invention provide a charging support method which can smoothly perform charging among an unspecified number of electronic apparatuses.

An aspect of the invention provides a charging support method comprising: a step of allowing a computer to acquire from a power feed-permitting electronic apparatus, positional information of the power feed-permitting electronic apparatus, which is an electronic apparatus equipped with a battery and having a power feed function of feeding power of the battery to other electronic apparatuses, and permits a power feed to other electronic apparatuses; a step of allowing the computer to receive from a power feed-desiring electronic apparatus, positional information of the power feed-desiring electronic apparatus, which is an electronic apparatus equipped with a battery and having a power reception function of charging the battery with power transmitted from other electronic apparatuses and a display unit, and desires a power feed from other electronic apparatuses; a step of allowing the computer to specify the power feed-permitting electronic apparatus in a periphery of the power feed-desiring electronic apparatus using the positional information received from the power feed-desiring electronic apparatus and the acquired positional information of the power feed-permitting electronic apparatus in a database; and a reply information transmission step of allowing the computer to generate reply information including the positional information of the specified power feed-permitting electronic apparatus and to transmit the reply information to the power feed-desiring electronic apparatus.

Another aspect of the invention provides a charging support management device comprising: a control unit which executes the respective steps of the charging support method.

Another aspect of the invention provides a charging support system comprising: the charging support management device; the at least one electronic apparatus which is equipped with the battery, has the power feed function of feeding power of the battery to other electronic apparatuses, and is communicable with the charging support management device; and the at least one electronic apparatus which is equipped with the battery, has the power reception function of charging the battery with power transmitted from other electronic apparatuses and the display unit, and is communicable with the charging support management device.

With any one of the aspects, it is possible to provide a charging support method which can smoothly perform charging among an unspecified number of electronic apparatuses.

BRIEF DESCRIPTION OF DRAWINGS

FIG. 4 is a diagram showing an example of a table which is recorded in a database 40.

DESCRIPTION OF EMBODIMENTS

Figure 1:
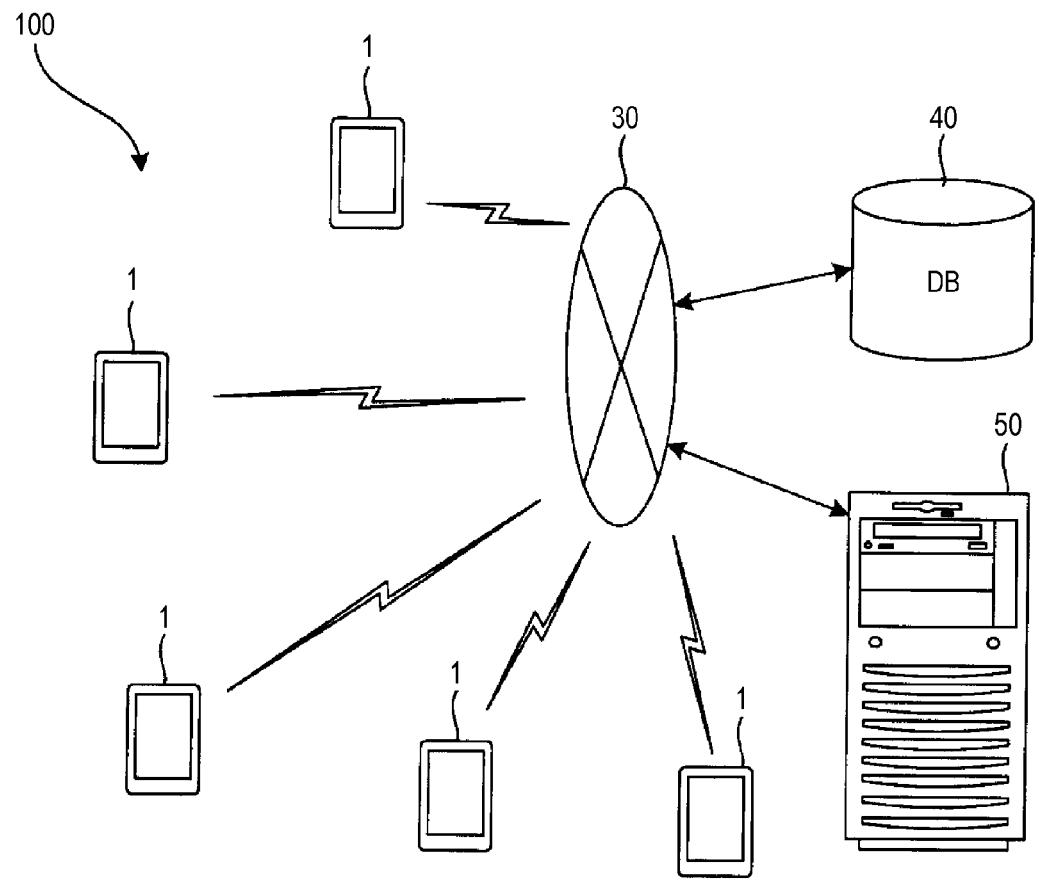
FIG. 1 is a diagram showing the schematic configuration of a charging support system illustrating an embodiment of the invention.

Hereinafter, an embodiment of the invention will be described referring to the drawings.

FIG. 1 is a diagram showing the schematic configuration of a charging support system illustrating an embodiment of the invention.

A charging support system 100 includes a plurality of (in an example of FIG. 1, five) electronic apparatuses 1, a network 30, such as the Internet, a database 40, and a management server 50.

Each electronic apparatus 1 and the network 30 are connected in a wireless or wired manner. The database 40 and the management server 50 are connected to the network 30 in a wireless or wired manner. The database 40 may be configured such that data access is possible from the management server 50, may be embedded in the management server 50, or may be connected to the management server 50 through the network 30.

The management server 50 includes a communication interface which is provided to communicate with other apparatuses through the network 30, a memory, such as a RAM which functions as a work memory or a ROM which stores various programs, and a computer which executes various programs stored in the ROM. Various programs include a management program which is created by an administrator of the charging support system 100. A process which is described below and performed by the management server 50 is performed by the computer executing the management program.

The electronic apparatuses 1 are mobile terminals having a communication function with the network 30, such as mobile phones including smartphones, tablet terminals, notebook PCs, digital cameras, and portable game machines, and vehicles, such as automobiles and electric bicycles having a communication function with the network 30. The electronic apparatuses 1 are owned by users who participate in the charging support system 100.

Figure 2:
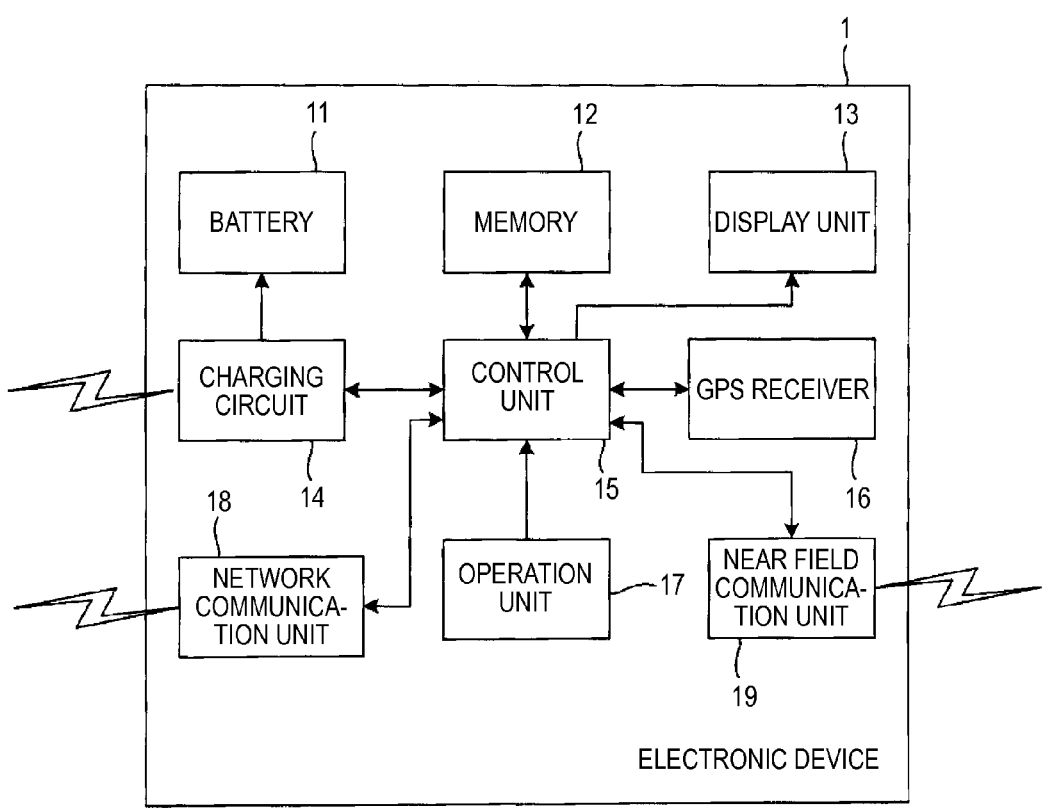
FIG. 2 is a diagram showing the internal configuration of an electronic apparatus 1 which is used in a charging support system 100 shown in FIG. 1.

FIG. 2 is a diagram showing the internal configuration of an electronic apparatus 1 which is used in the charging support system 100 shown in FIG. 1.

The electronic apparatus 1 includes a battery 11, a memory 12 including a RAM, a ROM, and the like, a display unit 13 which is constituted by liquid crystal, organic EL, or the like and displays various kinds of information, a charging circuit 14 which charges the battery 11, a control unit 15 which is primarily constituted by a processor and performs integrated control of the entire apparatus, a GPS receiver 16, an operating unit 17 which is provided to issue various instructions to the control unit 15, a network communication unit 18, and a near field communication unit 19.

The charging circuit 14 includes a power reception coil and a power transmission coil. The power reception coil of the charging circuit 14 receives power fed from the power transmission coil in a charging circuit 14 of another electronic apparatus 1 in a wireless manner and charges the battery 11 with power. The transmission coil of the charging circuit 14 feeds power to a power reception coil of the charging circuit 14 of another electronic apparatus 1 and charges a battery 11 of the electronic apparatus 1.

The network communication unit 18 is a communication interface which is provided to perform communication with other apparatuses through the network 30.

The near field communication unit 19 performs communication with another apparatuses in a wireless manner without passing through the network 30. For example, the near field communication unit 19 is constituted by a communication module based on the standard of noncontact IC, Bluetooth (Registered Trademark), or the like.

The GPS receiver 16 receives a signal from a GPS (Global Positioning System) satellite. The control unit 15 detects the position (longitude and latitude) of the electronic apparatus 1 on the earth using the signal received by the GPS receiver 16 and generates information representing the position.

Apparatus information relating to the electronic apparatus 1 is stored in the ROM of the memory 12. The apparatus information includes, for example, an apparatus ID of the electronic apparatus 1, an owner ID for identifying an owner of the electronic apparatus 1, an IP address of the electronic apparatus 1 on the network 30, and information representing a range where the electronic apparatus 1 performs a power feed to other apparatuses (a radius *m centering on the electronic apparatus 1, or the like), and the like.

The ROM of the memory 12 stores a mutual charging program which is an application program distributed by the administrator of the charging support system 100.

Next, the operation of the charging support system 100 configured as above will be described. In the electronic apparatus 1 in which the mutual charging program is installed, when the program is installed, the control unit 15 transmits the apparatus information of the host apparatus from the network communication unit 18 to the management server 50. The management server 50 records the received apparatus information to the database 40.

Figure 3:
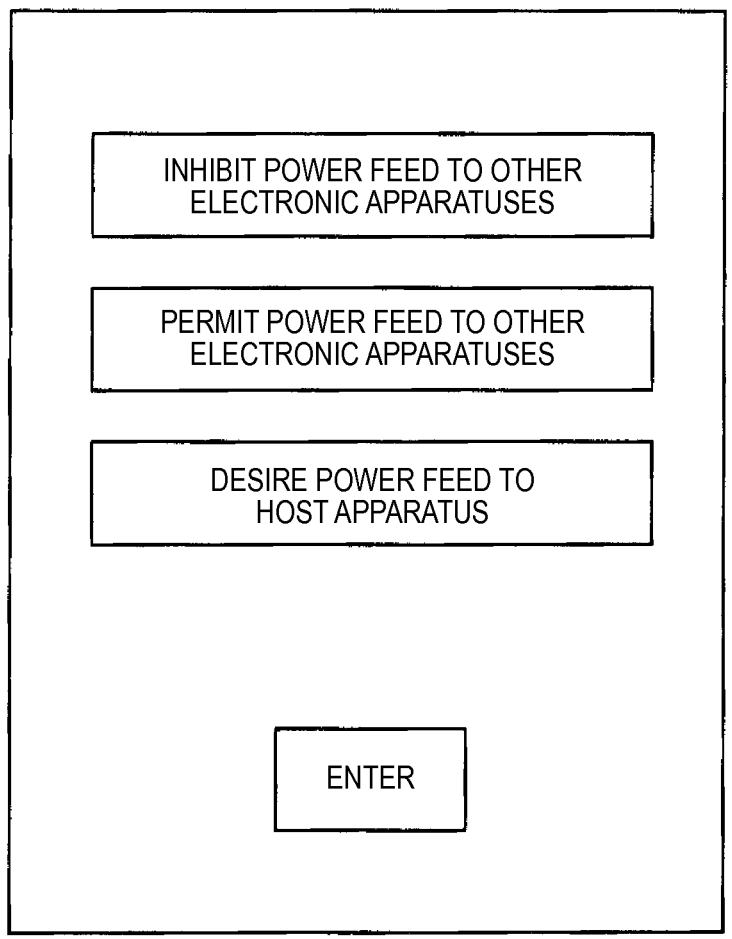
FIG. 3 is a diagram showing a screen example which is displayed on a display unit 13 of the electronic apparatus 1.

If the owner of the electronic apparatus 1 in which the mutual charging program is installed performs an operation to start the mutual charging program, the control unit 15 executes the mutual charging program, and for example, displays a screen shown in FIG. 3 on the display unit 13.

If the owner of the electronic apparatus 1 selects a button "permit power feed to other apparatuses" on the screen of FIG. 3 and presses an "enter" button, the control unit 15 of the electronic apparatus 1 transmits the apparatus ID stored in the memory 12, information representing that a power feed is permitted, and current positional information of the electronic apparatus 1 from the network communication unit 18 to the management server 50.

If the owner of the electronic apparatus 1 selects a button "inhibit power feed to other apparatuses" on the screen of FIG. 3 and presses the "enter" button, the control unit 15 of the electronic apparatus 1 transmits the apparatus ID stored in the memory 12 and information representing that a power feed is inhibited, from the network communication unit 18 to the management server 50.

If the apparatus ID, information relating to the permission and inhibition of the power feed, and the positional information are received from the electronic apparatus 1, the management server 50 records information other than the apparatus ID in correlation with the apparatus ID recorded in the database 40.

FIG. 4 is a diagram showing an example of a table which is recorded in the database 40. As shown in FIG. 4, information relating to the positional information, the owner ID, the power feedable range, power feed permission and inhibition, a power feed record, a power reception record, and the like can be recorded for each apparatus ID.

The management server 50 regularly requests transmission of positional information of an electronic apparatus 1 with an apparatus ID for which information of power feed permission is recorded in the table of FIG. 4. The control unit 15 of the electronic apparatus 1 transmits the positional information of the host apparatus to the management server 50 in response to this request. If new positional information is received from the electronic apparatus 1, the management server 50 updates the positional information of the electronic apparatus 1 recorded in the database 40. In this way, in regards to the electronic apparatus 1 (hereinafter, power feedable (power feed-permitting) electronic apparatus 1) for which power feed permission is set, the positional information in the database 40 is updated regularly.

Figure 5:
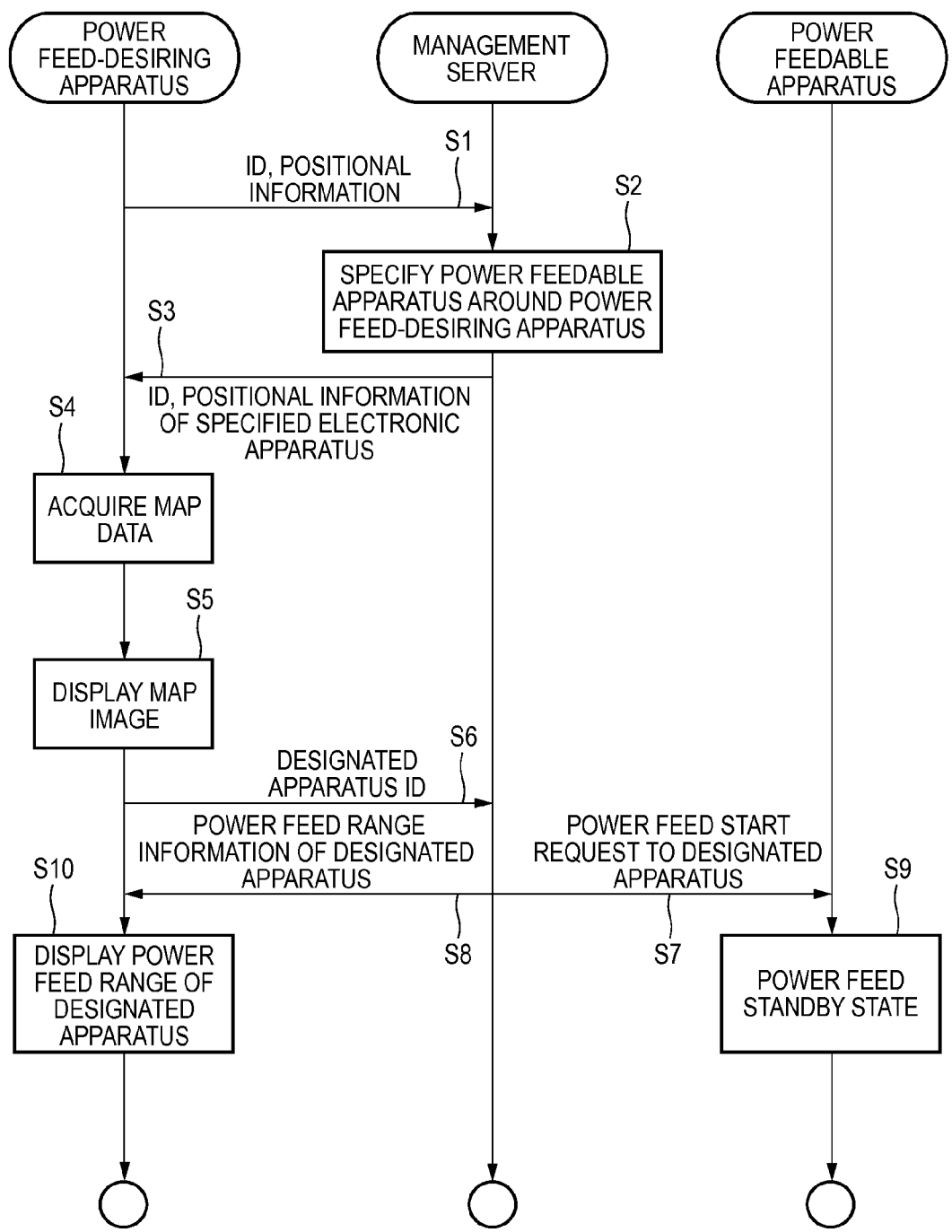
FIG. 5 is a sequence chart illustrating the operation of the charging support system 100.

Next, an operation after information is recorded in the database 40 in the above-described manner will be described. FIG. 5 is a sequence chart illustrating the operation of the charging support system 100.

If the owner of the electronic apparatus 1 selects a button "desire power feed to host apparatus" on the screen shown in FIG. 3 and presses the button "enter", the control unit 15 of the electronic apparatus 1 transmits the apparatus ID stored in the memory 12, information representing the a power feed is desired, and current positional information of the electronic apparatus 1 from the network communication unit 18 to the management server 50 (Step S51). The control unit 15 of the electronic apparatus 1 may monitor the residual capacity of the battery 11, and when the residual quantity falls below a value determined in advance, may perform the process of Step 51 regardless of the presence and absence of a user's operation.

If the apparatus ID, information representing that a power feed is desired, and positional information are received from the electronic apparatus 1 (hereinafter, referred to as a power feed-desiring electronic apparatus 1), the management server 50 specifies power feedable electronic apparatuses 1 in the periphery of the power feed-desiring electronic apparatus 1 using the received positional information and the positional information of the power feedable electronic apparatuses 1 recorded in the database 40 (Step S2). The specified power feedable electronic apparatus 1 may be referred to as a specific power feedable electronic apparatus 1.

The periphery of the power feed-desiring electronic apparatus 1 may be set to a value set appropriately on system operation, for example, so as to be within a radius 50 m centering on the position of the power feed-desiring electronic apparatus 1. A range representing the periphery of the power feed-desiring electronic apparatus 1 may be freely set by the owner of the power feed-desiring electronic apparatus 1.

After Step S2, the management server 50 acquires the positional information and the apparatus ID from the specific power feedable electronic apparatus 1 from the database 40 and transmits the positional information and the apparatus ID to the power feed-desiring electronic apparatus 1 (Step S3).

The control unit 15 of the power feed-desiring electronic apparatus 1 acquires map data including a place where there are the specific power feedable electronic apparatus 1 and the power feed-desiring electronic apparatus 1 based on the positional information of the host apparatus and the positional information of the specific power feedable electronic apparatus 1 received from the management server 50 from the database 40, an external server, or the like through the network 30 (Step S4).

The control unit 15 of the power feed-desiring electronic apparatus 1 generates map image data in which the position of the power feed-desiring electronic apparatus 1 and the position of the specific power feedable electronic apparatus 1 are written on the acquired map data and displays an image based on map image data on the display unit 13 (Step S5).

Figure 6:
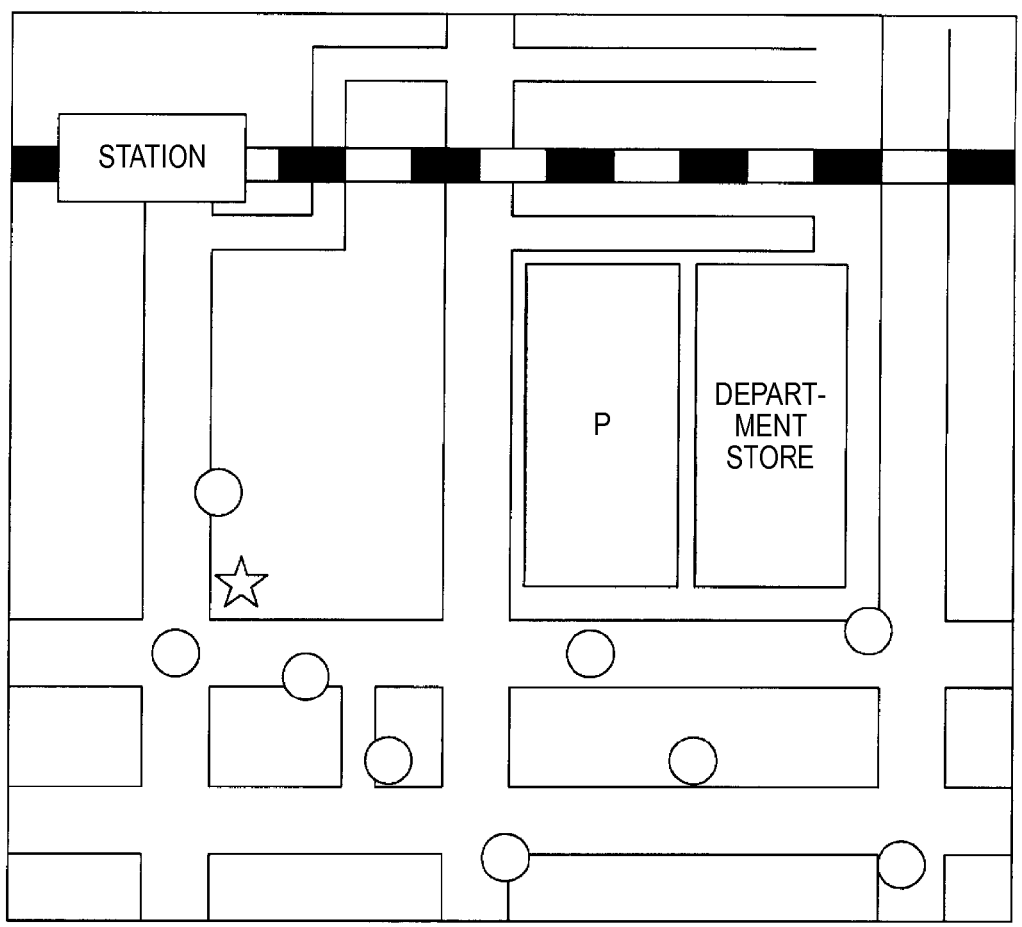
FIG. 6 is a diagram showing an example of map image data which is generated by a power feed-desiring electronic apparatus 1.

FIG. 6 is a diagram showing an example of map image data which is generated by a power feed-desiring electronic apparatus 1.

FIG. 6 shows map image data in which a star mark is written at the position of a power feed-desiring electronic apparatus 1 on the map and round marks are written at the positions of specific power feedable electronic apparatuses 1 on the map.

The owner of the power feed-desiring electronic apparatus 1 can instantly know where a power feedable electronic apparatus 1 is present in the periphery of the power feed-desiring electronic apparatus 1 from the image of FIG. 6 displayed on the display unit 13.

When there is a change in the positional information of the power feed-desiring electronic apparatus 1 or there is a change in the positional information of the power feedable electronic apparatus 1, the management server 50 performs the process of Step S2 and S3 again and transmits the positional information and the apparatus ID of the specific power feedable electronic apparatus 1 to the power feed-desiring electronic apparatus 1.

With this, when there is a change in the positional information of the power feed-desiring electronic apparatus 1 or there is a change in the positional information of the power feedable electronic apparatus 1, the position of the power feed-desiring electronic apparatus 1 or the position of each power feedable electronic apparatus 1 displayed on the display unit 13 of the power feed-desiring electronic apparatus 1 changes.

In a state where the image shown in FIG. 6 is displayed on the display unit 13, the owner of the power feed-desiring electronic apparatus 1 performs an operation to select any round mark of FIG. 6. In response to this operation, the control unit 15 of the power feed-desiring electronic apparatus 1 transmits the apparatus ID of the selected specific power feedable electronic apparatus 1 to the management server 50 (Step S6).

If the apparatus ID is received from the power feed-desiring electronic apparatus 1, the management server 50 transmits power feed start request information to request to start a power feed to the power feedable electronic apparatus 1 corresponding to the apparatus ID (Step S7). The management server 50 acquires power feedable range information corresponding to the apparatus ID from the database 40 and transmits the power feedable range information to the power feed-desiring electronic apparatus 1 (Step S8).

If the power feed start request information is received from the management server 50, the control unit 15 of the power feedable electronic apparatus 1 is transited to a power feed standby state so as to start a power feed to the power feed-desiring electronic apparatus 1 anytime (Step S9).

Figure 7:
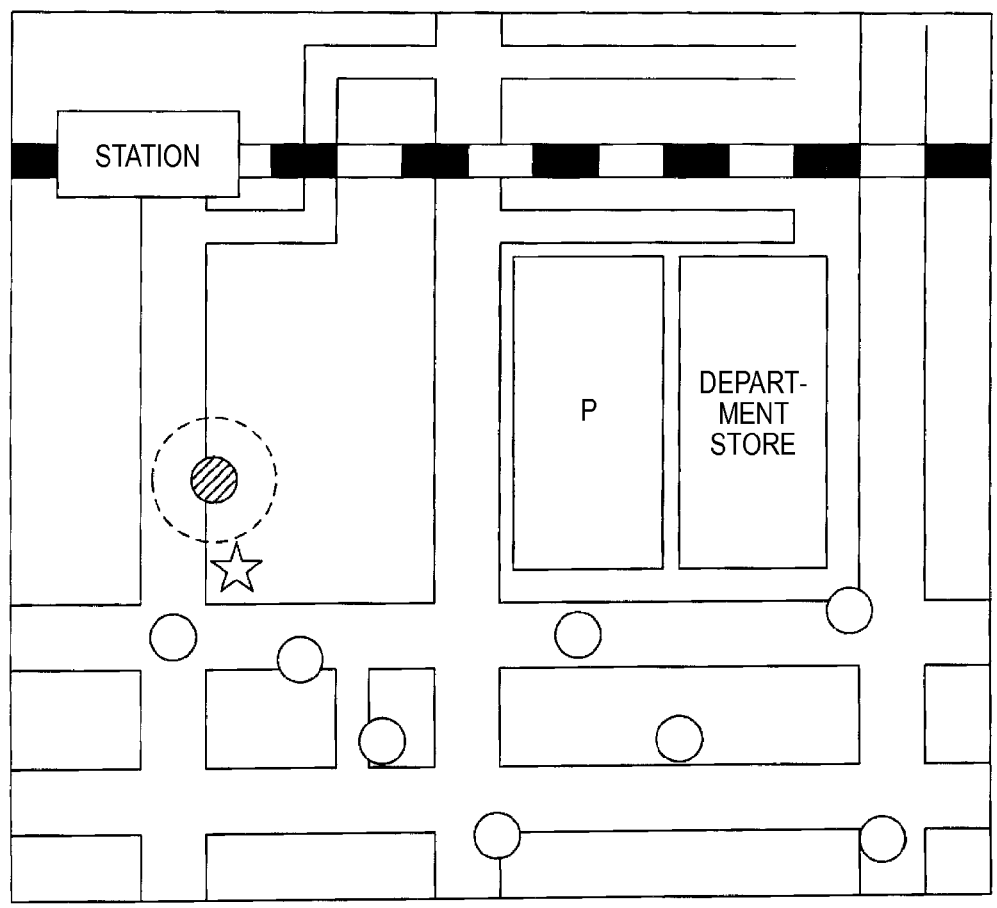
FIG. 7 is a diagram showing an example of map image data which is generated by the power feed-desiring electronic apparatus 1.

If the power feedable electronic apparatus 1 is selected by the owner, for example, as shown in FIG. 7, the control unit 15 of the power feed-desiring electronic apparatus 1 displays the selected power feedable electronic apparatus 1 in distinction from other power feedable electronic apparatuses 1. As indicated by a broken-line circle of FIG. 7, the control unit 15 of the power feed-desiring electronic apparatus 1 superimposes the power feedable range of the selected power feedable electronic apparatus 1 on the image displayed on the display unit 13 according to information representing the power feedable range received from the management server 50.

Figure 8:
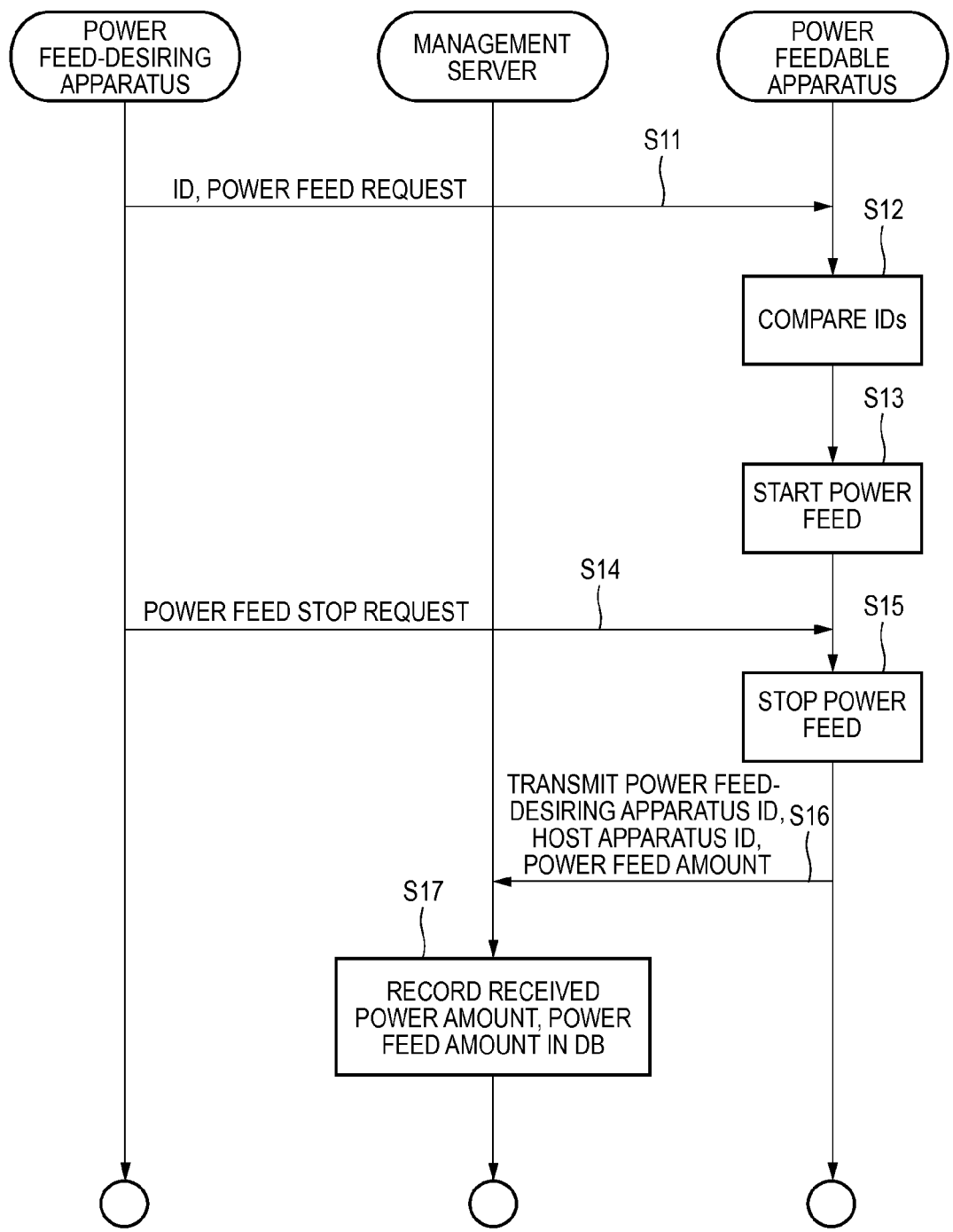
FIG. 8 is a sequence chart illustrating the operation of the system after a power feedable electronic apparatus 1 is placed in a power feed standby state.

FIG. 8 is a sequence chart illustrating the operation of the system after the power feedable electronic apparatus 1 is placed in the power feed standby state.

The owner of the power feed-desiring electronic apparatus 1 moves such that the position of the host apparatus enters the broken-line circle while viewing the image shown in FIG. 7. The control unit 15 of the power feed-desiring electronic apparatus 1 transmits the apparatus ID and a power feed request signal to the power feedable electronic apparatus 1 through the near field communication unit 19 if it is detected that the host apparatus enters the power feedable range of the power feedable electronic apparatus 1 (Step S11).

The power feedable electronic apparatus 1 when receives the apparatus ID and the power feed request signal from the power feed-desiring electronic apparatus 1 inquires of the management server 50 with the apparatus ID of the electronic apparatus 1 which requests a power feed to the management server 50 and compares the apparatus ID with the apparatus ID received from the power feed-desiring electronic apparatus 1 (Step S12).

As a result of comparison, if the two apparatus IDs match each other, the control unit 15 of the power feedable electronic apparatus 1 starts to transmit power from the power transmission coil in the charging circuit 14 (Step S13).

With this, the battery 11 of the power feed-desiring electronic apparatus 1 is charged with power transmitted from the power feedable electronic apparatus 1. As a result of comparison, when the two apparatus IDs do not match each other, the control unit 15 of the power feed-desiring electronic apparatus 1 does not start to transmit power.

After the power feed by the power feedable electronic apparatus 1 starts, if a necessary battery residual capacity is secured in the power feed-desiring electronic apparatus 1, the control unit 15 of the power feed-desiring electronic apparatus 1 transmits a power feed stop request signal to the power feedable electronic apparatus 1 through the near field communication unit 19 (Step S14).

The control unit 15 of the power feedable electronic apparatus 1 which receives the power feed stop request signal stops the power feed from the charging circuit 14 (Step S15). The control unit 15 of the power feedable electronic apparatus 1 transmits the apparatus ID of the host apparatus, the apparatus ID of the power feed-desiring electronic apparatus 1 compared in Step S12, and the power feed amount to the power feed-desiring electronic apparatus 1 to the management server 50 (Step S16).

Next, the management server 50 records information of the power feed amount received from the power feedable electronic apparatus 1 in the database 40 (Step S17).

Specifically, the management server 50 respectively records information of the power feed amount received from the power feedable electronic apparatus 1 in the item "power feed record [A]" corresponding to the apparatus ID of the power feedable electronic apparatus 1 received from the power feedable electronic apparatus 1 and an item "power reception record [A]" corresponding to the apparatus ID of the power feed-desiring electronic apparatus 1 received from the power feedable electronic apparatus 1.

If numerical values are already recorded in the items "power feed record [A]" and "power reception record [A]", the management server 50 records values obtained by adding the numerical value of the power amount received from the power feedable electronic apparatus 1 to the numerical values in the items.

If the process of Step S17 ends, the management server 50 stops the transmission of the positional information and the apparatus ID of the power feedable electronic apparatus 1 to the power feed-desiring electronic apparatus 1.

When there is an apparatus ID for which the numerical value recorded in "power feed record [A]" of the database 40 reaches a value determined in advance, the management server 50 generates consideration payment data for paying a consideration (cash, point, or the like) of the power feed to the owner of the electronic apparatus 1 with the apparatus ID.

When there is an apparatus ID for which the numerical value recorded in "power reception record [A] of the database 40 reaches a value determined in advance, the management server 50 generates charging fee claim data for claiming a charging fee to the owner of the electronic apparatus 1 with the apparatus ID.

The management server 50 transmits consideration payment data and charging fee claim data to a communication carrier for connection of the electronic apparatus 1 to the network 30.

With this, it is possible to pay a consideration based on consideration payment data from the communication carrier to the owner to the electronic apparatus 1 or to claim a charging fee based on charging fee claim data.

As described above, according to this system, it is possible to confirm whether or not a power feed is possible based on information from the management server 50 without confirming with the electronic apparatus 1 in the periphery of the host apparatus. For this reason, it is possible to allow the owner of the power feed-desiring electronic apparatus 1 to smoothly start the charging of the host apparatus without stress.

According to this system, an operation to select the power feedable electronic apparatus 1 displayed on the display unit 13 is performed in the power feed-desiring electronic apparatus 1, whereby a power feed request is made to the selected power feedable electronic apparatus 1. Thereafter, the power feed-desiring electronic apparatus 1 merely enters the power feedable range of the power feedable electronic apparatus 1, whereby a power feed is performed from the power feedable electronic apparatus 1 to the power feed-desiring electronic apparatus 1. For this reason, it takes no labor to search for an electronic apparatus 1 which can perform a power feed for a user who wants charging, it is not necessary to obtain permission for a power feed from the owner of the power feedable electronic apparatus 1, and it is possible to smoothly start the charging of the host apparatus without stress.

According to this system, it is possible to pay a consideration based on consideration payment data to the owner of the electronic apparatus 1 which performs a power feed and to claim a charging fee based on charging fee claim data to the owner of the electronic apparatus 1 which receives a power feed. In this way, a mechanism is made such that a consideration is paid to a user who performs a power feed, whereby it is possible to increase the number of users who participate in the system and to promote the spread of the system.

Hereinafter, modification examples of the charging support system 100 will be described.

(First Modification Example)

The purpose of this system resides in that an owner of an electronic apparatus having a power reception function of receiving a power feed from other apparatuses and charging a battery can charge a battery of the host apparatus without needing troublesome work. Accordingly, this system may include at least one electronic apparatus having a power feed function of transmitting power of the battery of the host apparatus to other apparatuses, and at least one electronic apparatus having the power reception function. That is, as shown in FIG. 1, all electronic apparatuses 1 may have the power reception function and the power feed function.

In regards to an electronic apparatus 1 having only a power reception function, "power feed inhibition" may be recorded as information regarding to power feed permission and inhibition recorded in the database 40 at the time of the installation of the mutual charging program. In regards to an electronic apparatus 1 having only a power feed function, a button "desire power feed to host apparatus" on the screen shown in FIG. 3 may not be selected.

(Second Modification Example)

In the database 40, in addition to information of a movable electronic apparatus 1, information of (charging device ID, positional information, information of power feed permission) of a fixed charging device may be stored in advance. The charging device has a configuration in which the battery 11, the display unit 13, and the GPS receiver 16 in the electronic apparatus 1 are removed, and the charging circuit 14 is configured as a circuit capable of performing a power feed to the electronic apparatus 1.

When information of the charging device is recorded in the database 40, the management server 50 specifies the power feedable electronic apparatuses 1 including the charging device in the periphery of the power feed-desiring electronic apparatus 1 in Step S2 of FIG. 5 and transmits the positional information and the apparatus IDs of the specified power feedable electronic apparatuses 1 (including the charging device) to the power feed-desiring electronic apparatus 1.

Figure 9:
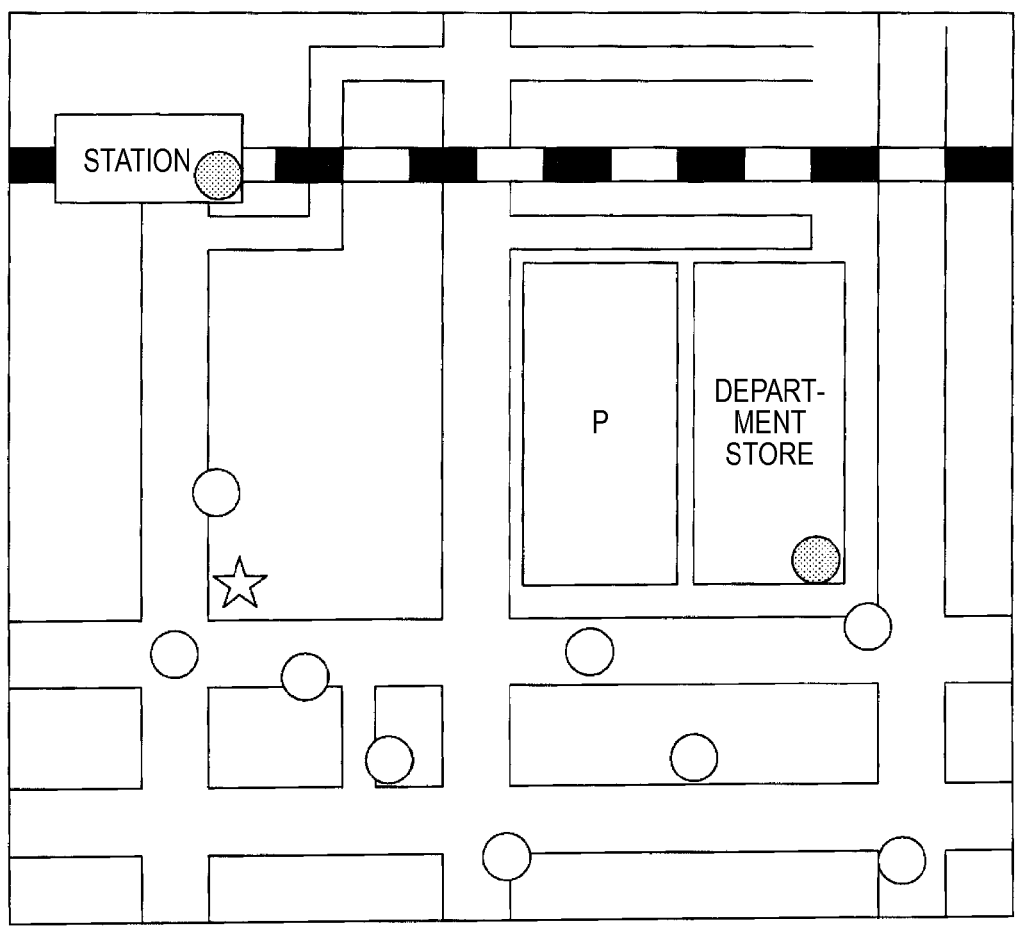
FIG. 9 is a diagram showing an example of map image data which is generated by the power feed-desiring electronic apparatus 1.

For example, as shown in FIG. 9, the control unit 15 of the power feed-desiring electronic apparatus 1 displays the specific power feedable electronic apparatuses 1 such that the movable electronic apparatuses 1 and the fixed charging device are in distinction from one another using different marks representing the positions. In this system, since there is an assumption that the movable electronic apparatuses 1 are used, the control unit 15 determines that all apparatuses other than the charging device are movable.

In this way, information of the charging device in the periphery of the power feed-desiring electronic apparatus 1 is also provided to the owner of the power feed-desiring electronic apparatus 1, whereby it is possible to improve convenience.

In this modification example, the management server 50 may gather information (for example, information representing how many apparatuses can be charged simultaneously or how many apparatuses are being charged) of the usage situation of the charging device and may transmit information to the power feed-desiring electronic apparatus 1 in Step S3 of FIG. 5. With this, it is possible to confirm the usage situation of the charging device on the display unit 13 of the power feed-desiring electronic apparatus 1 and to further improve convenience.

(Third Modification Example)

As the electronic apparatuses 1 which can participate in this system, in addition to mobile terminals, there are vehicles, such as automobiles, motorcycles, and electric bicycles. The mobile terminals and the vehicles are significantly different in battery capacity width.

As the power feed-desiring electronic apparatus 1, an apparatus which receives a power feed from a vehicle having large battery capacity and performs stable charging can be used. In case of an automobile or a motorcycle, there are many cases where the automobile or the motorcycle is standing in a parking area, and if the automobile or the motorcycle which is standing is the power feedable electronic apparatus 1, there is a low possibility that the power feedable electronic apparatus 1 moves during charging. Accordingly, it is possible to perform charging without stress.

In this modification example, a form in which attribute information is included in the apparatus information of the electronic apparatus 1 is made.

The attribute information is information representing a type when electronic apparatuses 1 are classified into a plurality of types according to battery capacity. For example, the electronic apparatuses 1 can be classified into two types of mobile terminals having comparatively small battery capacity and vehicles having comparatively large battery capacity.

In Step S3 of FIG. 5, the management server 50 also transmits the attribute information of the power feedable electronic apparatuses 1 to the power feed-desiring electronic apparatus 1.

Figure 10:
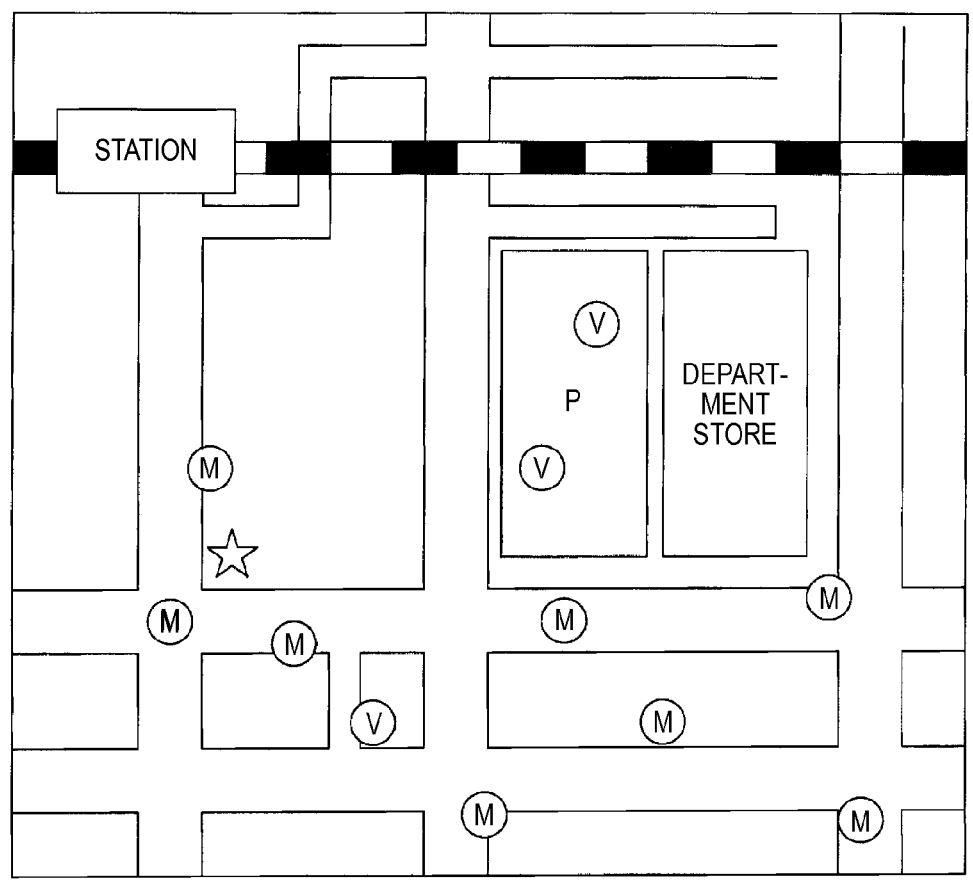
FIG. 10 is a diagram showing an example of map image data which is generated by the power feed-desiring electronic apparatus 1.

In Step S4 of FIG. 5, for example, as shown in FIG. 10, the control unit 15 of the power feed-desiring electronic apparatus 1 generates map image data such that the attributes of the power feedable electronic apparatuses 1 can be in distinction from one another according to the attribute information received from the management server 50.

In this way, the types of the power feedable electronic apparatuses 1 can be in distinction from one another on the image displayed on the display unit 13, whereby it is possible to allow the owner of the power feed-desiring electronic apparatus 1 to select an optimum power feedable electronic apparatus 1 according to the purpose and to improve convenience.

In this modification example, the control unit 15 of the power feed-desiring electronic apparatus 1 may display only the power feedable electronic apparatuses 1 of the type designated by the owner of the power feed-desiring electronic apparatus 1. With this, it is possible to display only necessary information, thereby improving convenience.

(Fourth Modification Example)

As the electronic apparatus 1 which feeds power of the battery, if excessive power is fed to other apparatuses, the battery capacity of the host apparatus decreases, and the decrease in battery capacity may affect the operation. For this reason, it is preferable that the electronic apparatus 1 side can set the upper limit value of the power amount to be fed.

For example, the operating unit 17 of the electronic apparatus 1 may be operated to input the upper limit value of the power amount to be fed by the electronic apparatus 1. The control unit 15 of the electronic apparatus 1 stores the input upper limit value as one kind of apparatus information in the memory 12. In Step S3 of FIG. 5, the management server 50 transmits the positional information, the apparatus IDs, and the power feedable upper limit values of the specific power feedable electronic apparatuses 1 to the power feed-desiring electronic apparatus 1.

Figure 11:
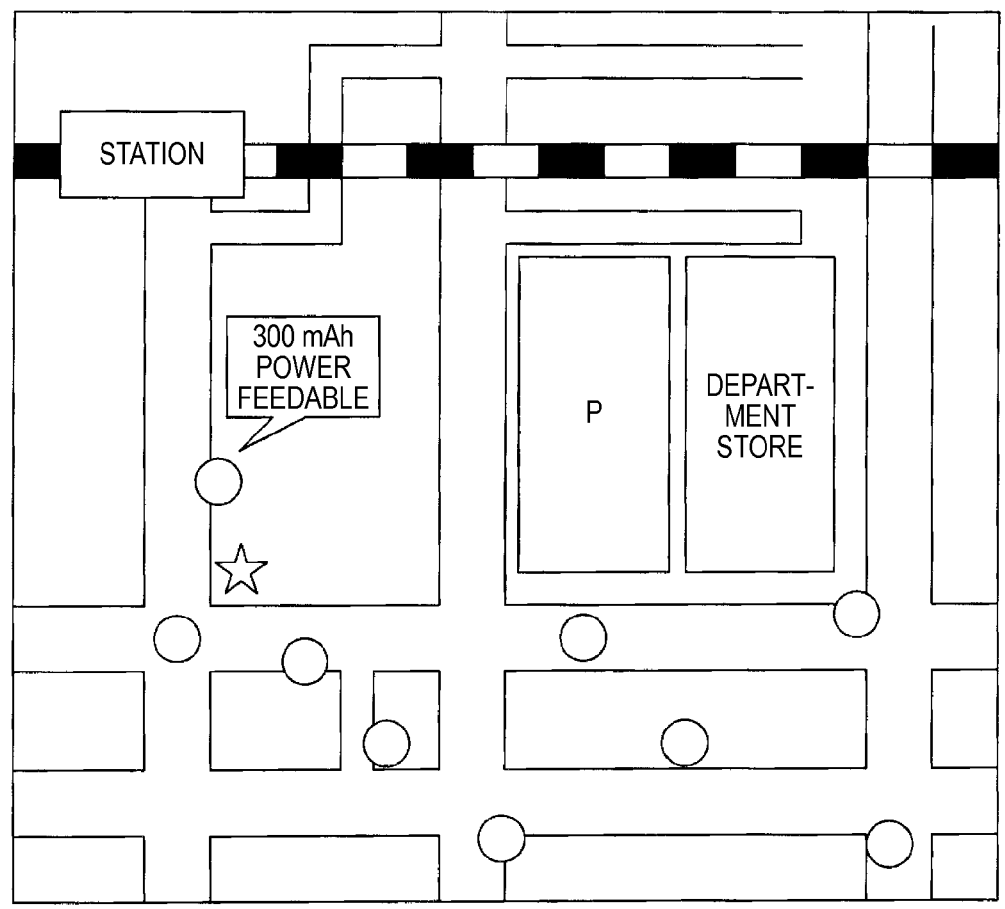
FIG. 11 is a diagram showing an example of map image data which is generated by the power feed-desiring electronic apparatus 1.

In Step S5 of FIG. 5, for example, as shown in FIG. 11, the control unit 15 of the power feed-desiring electronic apparatus 1 displays the power feedable upper limit value of the power feed-desiring electronic apparatus 1 along with the position of the power feed-desiring electronic apparatus 1. FIG. 11 shows the power feedable upper limit value only for some power feedable electronic apparatuses 1.

Figure 12:
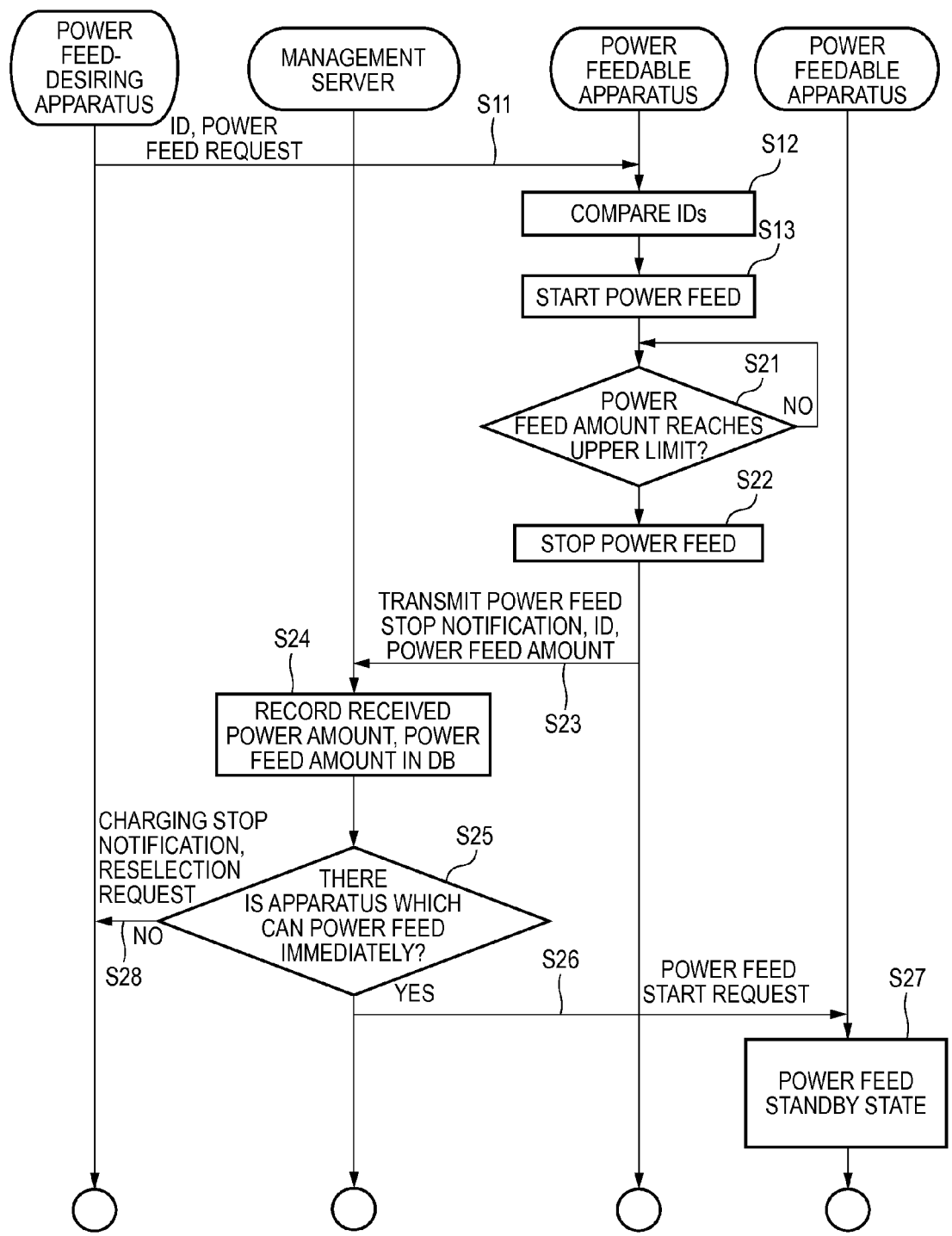
FIG. 12 is a sequence chart illustrating the operation of a fourth modification example of a charging support system.

FIG. 12 is a sequence chart illustrating the operation of the fourth modification example of the charging support system. FIG. 12 shows an operation after the power feedable electronic apparatus 1 is selected by the power feed-desiring electronic apparatus 1, and the power feedable electronic apparatus 1 is placed in the power feed standby state.

Steps S11 to S13 are the same operation as in FIG. 8.

In Step S13, if a power feed is started by the power feedable electronic apparatus 1 and the power feed amount reaches the power feedable upper limit value set in the power feedable electronic apparatus 1 (Step S21: YES), the control unit 15 of the power feedable electronic apparatus 1 stops the power feed (Step S22).

The control unit 15 of the power feedable electronic apparatus 1 transmits information representing that the power feed is stopped, the apparatus ID of the host apparatus, the apparatus ID of the power feed-desiring electronic apparatus 1, and the power feed amount to the management server 50 (Step S23).

Next, similarly to Step S17 of FIG. 8, the management server 50 records the power feed amount received from the power feedable electronic apparatus 1 in the database 40 (Step S24).

Subsequently, the management server 50 searches for the power feedable electronic apparatus 1 including the power feed-desiring electronic apparatus 1 in the power feedable range on the database 40, and when there is the power feedable electronic apparatus 1 (Step S25: YES), issues a power feed start request to the power feedable electronic apparatus 1 (Step S26). The control unit 15 of the power feedable electronic apparatus 1 which receives the power feed start request is transited to the power feed standby state (Step S27).

In case of Step S25: YES, since there is already the power feed-desiring electronic apparatus 1 in the power feedable range of the power feedable electronic apparatus 1 placed in the power feed standby state in Step S27, the authentication process of Steps S11 and 12 described referring to FIG. 8 is performed between the power feedable electronic apparatus 1 and the power feed-desiring electronic apparatus 1, and thereafter, a power feed to the power feed-desiring electronic apparatus 1 is started.

When there is no power feedable electronic apparatus 1 (Step S25: NO), the management server 50 notifies the power feed-desiring electronic apparatus 1 that the power feed is stopped, and issues a request to select another power feedable electronic apparatus 1 (Step S28).

The control unit 15 of the power feed-desiring electronic apparatus 1 which receives the notification and the request notifies the user that charging is stopped through the display unit 13, and performs display to request to select an electronic apparatus again.

As described above, according to the fourth modification example, it is possible to prevent power more than necessary from being transmitted from the power feedable electronic apparatus 1 to the power feed-desiring electronic apparatus 1. Accordingly, it is expected that even a user who has an electronic apparatus 1 having less margin in battery capacity performs the setting of power feed permission readily, and the number of power feedable electronic apparatuses 1 increases, thereby improving the degree of satisfaction of the owner of the power feed-desiring electronic apparatus 1.

According to the fourth modification example, even when the power feed to the power feed-desiring electronic apparatus 1 is stopped halfway, when there is another power feedable electronic apparatuses 1 near the power feed-desiring electronic apparatus 1, it is possible to start a power feed from another power feedable electronic apparatus 1 to the power feed-desiring electronic apparatus 1 without a special operation by the owner of the power feed-desiring electronic apparatus 1. Accordingly, it is possible to provide a service without imposing a sense of discomfort to the owner of the power feed-desiring electronic apparatus 1 since the power feed is stopped halfway.

In the description of FIG. 12, when the power feed amount reaches the upper limit value in Step S21, the management server 50 performs the process of Step S25. However, the invention is not limited thereto, and when the power feed from the power feedable electronic apparatus 1 is forcibly stopped for some reason, the management server 50 may perform the process of Step S25.

For example, when the power feed-desiring electronic apparatus 1 is out of the power feed range of the power feedable electronic apparatus 1 during the power feed, when the power feed is forcibly stopped by the intention of the owner of the power feedable electronic apparatus 1 during the power feed, or the like, the process after Step S22 may be performed.

(Fifth Modification Example)

In Step S7 of FIG. 5, the management server 50 may issue a power feed start request to the power feedable electronic apparatus 1 designated by the power feed-desiring electronic apparatus 1 and may transmit the positional information of the power feed-desiring electronic apparatus 1 to the power feedable electronic apparatus 1. In this case, in the power feedable electronic apparatus 1, the control unit 15 may display the received position of the power feed-desiring electronic apparatus 1 and the position of the host apparatus on the display unit 13 along with the map.

In this way, the owner of the power feedable electronic apparatus 1 which performs the power feed can confirm the position of an electronic apparatus 1 requesting a power feed on the display unit 13.

(Sixth Modification Example)

In Step S16 of FIG. 8, although the power feedable electronic apparatus 1 transmits the apparatus ID of an electronic apparatus being charged, the apparatus ID of a charging electronic apparatus, and the power amount transmitted and received between both electronic apparatuses to the management server 50, the control unit 15 of the power feed-desiring electronic apparatus 1 may transmit these kinds of information to the management server 50. Information may be transmitted from both of the power feed-desiring electronic apparatus 1 and the power feedable electronic apparatus 1 to the management server 50.

(Seventh Modification Example)

In the above description, the management server 50 transmits the positional information and the apparatus ID of the specific power feedable electronic apparatus 1 to the power feed-desiring electronic apparatus 1, and the power feed-desiring electronic apparatus 1 generates and display the images shown in FIGS. 6, 7, 9, 10, and 11 according to information received from the management server 50. However, data for displaying the images shown in FIGS. 6, 7, 9, 10, and 11 may be generated on the management server 50 side. As described above, map image data is generated in the power feed-desiring electronic apparatus 1, whereby it is possible to reduce the load of the management server 50.

The respective modification examples described above may be appropriately combined.

In the above operation description, the processes which are performed by the control unit 15 of the power feed-desiring electronic apparatus 1 and the control unit 15 of the power feedable electronic apparatus 1 are realized by a computer performing mutual charging programs installed on the electronic apparatuses 1. The respective processes which are performed by the management server 50 are realized by a computer (control unit) executing a management program installed on the management server 50.

As described above, the following matters are disclosed in this specification.

It is disclosed a charging support method including: a step of allowing a computer to acquire from a power feed-permitting electronic apparatus, positional information of the power feed-permitting electronic apparatus, which is an electronic apparatus equipped with a battery and having a power feed function of feeding power of the battery to other electronic apparatuses, and permits a power feed to other electronic apparatuses; a step of allowing the computer to receive from a power feed-desiring electronic apparatus, positional information of the power feed-desiring electronic apparatus, which is an electronic apparatus equipped with a battery and having a power reception function of charging the battery with power transmitted from other electronic apparatuses and a display unit, and desires a power feed from other electronic apparatuses; a step of allowing the computer to specify the power feed-permitting electronic apparatus in a periphery of the power feed-desiring electronic apparatus using the positional information received from the power feed-desiring electronic apparatus and the acquired positional information of the power feed-permitting electronic apparatus; and a reply information transmission step of allowing the computer to generate reply information including the positional information of the specified power feed-permitting electronic apparatus and to transmit the reply information to the power feed-desiring electronic apparatus.

It is disclosed the charging support method, in which the computer classifies power feed-permitting electronic apparatuses having the power feed function into a plurality of types according to battery capacity, the method further includes: a step of allowing the computer to acquire information representing the type of the power feed-permitting electronic apparatus from the power feed-permitting electronic apparatus, and in the reply information transmission step, the computer transmits the reply information including information representing the type of the specified power feed-permitting electronic apparatus to the power feed-desiring electronic apparatus.

It is disclosed the charging support method, further including: a step of allowing the computer to acquire feedable power amount information set by the power feed-permitting electronic apparatus from the power feed-permitting electronic apparatus, in which, in the reply information transmission step, the computer transmits the reply information including the power amount information acquired from the specified power feed-permitting electronic apparatus to the power feed-desiring electronic apparatus.

It is disclosed the charging support method, further including: a step of allowing the computer to power feedable range information representing a power feedable range of the power feed-permitting electronic apparatus from the power feed-permitting electronic apparatus selected by the power feed-desiring electronic apparatus; and a step of allowing the computer to transmit the acquired power feedable range information to the power feed-desiring electronic apparatus.

It is disclosed the charging support method, further including: a step of allowing the computer to acquire power feedable range information representing a power feedable range of the power feed-permitting electronic apparatus from the power feed-permitting electronic apparatus; a step of, when the power feed is stopped during a power feed from the power feed-permitting electronic apparatus to the power feed-desiring electronic apparatus, allowing the computer to search for another power feed-permitting electronic apparatus having a power feed range based on the power feedable range information where there is the power feed-desiring electronic apparatus; and a step of allowing the computer to issue a power feed request to another searched power feed-permitting electronic apparatus.

It is disclosed the charging support method, further including: a step of allowing the computer to specify, using the positional information received from the power feed-desiring electronic apparatus and positional information of a fixed charging device having a function of feeding power to an electronic apparatus having the power reception function, the charging device in the periphery of the power feed-desiring electronic apparatus, in which, in the reply information transmission step, the computer transmits the reply information including the positional information of the specified charging device to the power feed-desiring electronic apparatus.

It is disclosed the charging support method, further including: a step of allowing the computer to acquire IDs of the respective electronic apparatuses including the electronic apparatus having the power feed function and the electronic apparatus having the power reception function from the respective electronic apparatuses; a step of allowing the computer to acquire a received power amount or a transmitted power amount from the power feed-desiring electronic apparatus or an electronic apparatus feeding power to the power feed-desiring electronic apparatus; a step of recording the acquired power amount in correlation with an ID of the power feed-desiring electronic apparatus and an ID of an electronic apparatus feeding power to the power feed-desiring electronic apparatus; a step of allowing the computer to generate information for charging a charging fee to an owner of an electronic apparatus with the ID in a state where a cumulative value of a received power amount corresponding to the ID reaches a value determined in advance; and a step of allowing the computer to generate information for paying price to an owner of an electronic apparatus with the ID in a state where a cumulative value of a power feed amount corresponding to the ID reaches a value determined in advance.

It is disclosed a charging support management device including: a control unit which executes the respective steps of the charging support method.

It is disclosed a charging support system including: the charging support management device; the at least one electronic apparatus which is equipped with the battery, has the power feed function of feeding power of the battery to other electronic apparatuses, and is communicable with the charging support management device; and the at least one electronic apparatus which is equipped with the battery, has the power reception function of charging the battery with power transmitted from other electronic apparatuses and the display unit, and is communicable with the charging support management device.

According to the invention, it is possible to provide a charging support method which can smoothly perform charging among an unspecified number of electronic apparatuses.

Although the invention has been described in connection with the specific embodiment, the invention is not limited to the embodiment, and various changes may be made without departing from the technical spirit of the invention.

This application is based on Japanese Patent Application No. 2012-154706, filed Jul. 10, 2012, the content of which is incorporated herein by reference.

What is claimed is:

1. A charging support method comprising:
a step of allowing a computer to acquire from a power feed-permitting electronic apparatus, positional information of the power feed-permitting electronic apparatus, which is an electronic apparatus equipped with a battery and having a power feed function of feeding power of the battery to other electronic apparatuses in a wireless manner, and permits a wireless power feed to the other electronic apparatuses;
a step of allowing the computer to receive from a power feed-desiring electronic apparatus, positional information of the power feed-desiring electronic apparatus, which is an electronic apparatus equipped with a battery and having a power reception function of charging the battery with power transmitted in a wireless manner from the other electronic apparatuses and a display unit, and desires a wireless power feed from the other electronic apparatuses;
a step of allowing the computer to specify the power feed-permitting electronic apparatus in a periphery of the power feed-desiring electronic apparatus using the positional information received from the power feed-desiring electronic apparatus and the acquired positional information of the power feed-permitting electronic apparatus;
a reply information transmission step of allowing the computer to generate reply information including the positional information of the specified power feed-permitting electronic apparatus and to transmit the reply information to the power feed-desiring electronic apparatus;
a step of allowing the computer to acquire power feedable range information representing a power feed range for a wireless power feed of the power feed-permitting electronic apparatus from the power feed-permitting electronic apparatus selected by the power feed-desiring electronic apparatus; and
a step of allowing the computer to transmit the acquired power feedable range information to the power feed-desiring electronic apparatus.

2. The charging support method according to claim 1, wherein the computer classifies power feed-permitting electronic apparatuses having the power feed function into a plurality of types according to battery capacity, the method further comprises:
a step of allowing the computer to acquire information representing the type of the power feed-permitting electronic apparatus from the power feed-permitting electronic apparatus, and
in the reply information transmission step, the computer transmits the reply information including information representing the type of the specified power feed-permitting electronic apparatus to the power feed-desiring electronic apparatus.

3. The charging support method according to claim 1, further comprising:
a step of allowing the computer to acquire feedable power amount information set by the power feed-permitting electronic apparatus from the power feed-permitting electronic apparatus,
wherein, in the reply information transmission step, the computer transmits the reply information including the power amount information acquired from the specified power feed-permitting electronic apparatus to the power feed-desiring electronic apparatus.

4. The charging support method according to claim 1, further comprising:
a step of, when the power feed is stopped during a power feed from the power feed-permitting electronic apparatus to the power feed-desiring electronic apparatus, allowing the computer to search for another power feed-permitting electronic apparatus having a power feed range based on the power feedable range information where there is the power feed-desiring electronic apparatus; and
a step of allowing the computer to issue a power feed request to another searched power feed-permitting electronic apparatus.

5. The charging support method according to claim 1, further comprising:
a step of allowing the computer to acquire IDs of the respective electronic apparatuses including the electronic apparatus having the power feed function and the electronic apparatus having the power reception function from the respective electronic apparatuses;
a step of allowing the computer to acquire a received power amount or a transmitted power amount from the power feed-desiring electronic apparatus or an electronic apparatus feeding power to the power feed-desiring electronic apparatus;
a step of recording the acquired power amount in correlation with an ID of the power feed-desiring electronic apparatus and an ID of the electronic apparatus feeding power to the power feed-desiring electronic apparatus;
a step of allowing the computer to generate information for charging a charging fee to an owner of an electronic apparatus with the ID in a state where a cumulative value of a received power amount corresponding to the ID reaches a value determined in advance; and
a step of allowing the computer to generate information for paying price to an owner of an electronic apparatus with the ID in a state where a cumulative value of a transmitted power amount corresponding to the ID reaches a value determined in advance.

6. A charging support management device comprising:
a control unit which executes the respective steps of the charging support method according to claim 1.

7. A charging support system comprising:
the charging support management device according to claim 6;
the at least one electronic apparatus which is equipped with the battery, has the power feed function of feeding power of the battery to other electronic apparatuses in the wireless manner, and is communicable with the charging support management device; and
the at least one electronic apparatus which is equipped with the battery, has the power reception function of charging the battery with power transmitted in the wireless manner from other electronic apparatuses and the display unit, and is communicable with the charging support management device.

* * * * *